US008869530B2

(12) United States Patent
Dethier et al.

(10) Patent No.: US 8,869,530 B2
(45) Date of Patent: Oct. 28, 2014

(54) FLAG-SHAPED HEAT EXCHANGER FOR CAPTURING RADIATION (75) Inventors: Alfred Dethier, Sprimont (BE); Elena García Ramirez, Seville (ES)

(73) Assignees: Cockerill Maintenance & Ingenierie S.A., Seraing (BE); Abengoa Solar New Technologies S.A., Seville (ES)

( * ) Notice: Subject to any disclaimer, the term of this patent is extended or adjusted under 35 U.S.C. 154(b) by 66 days.

(21) Appl. No.: 13/147,618

(22) PCT Filed: Feb. 11, 2010

(86) PCT No.: PCT/EP2010/051740
§ 371 (c)(1),
(2), (4) Date: Aug. 3, 2011

(87) PCT Pub. No.: WO2010/094618
PCT Pub. Date: Aug. 26, 2010

(65) Prior Publication Data
US 2011/0289921 A1 Dec. 1, 2011

(30) Foreign Application Priority Data
Feb. 17, 2009 (EP) .................................... 09153046

(51) Int. Cl.
F03G 6/00 (2006.01)
F24J 2/24 (2006.01)
F28D 7/06 (2006.01)
F22B 1/00 (2006.01)
F24J 2/07 (2006.01)

(52) U.S. Cl.
CPC . *F24J 2/07* (2013.01); *F22B 1/006* (2013.01); *Y02E 10/41* (2013.01)
USPC ....... 60/641.8; 60/641.11; 126/651; 126/655; 126/663; 165/176

(58) Field of Classification Search
USPC ......... 60/655, 641.1, 641.8–641.15; 126/663, 126/651, 655, 670, 569, 684, 694, 698; 165/152, 153, 175, 176; 122/512; 52/173.1, 645, 745.19
See application file for complete search history.

(56) References Cited

U.S. PATENT DOCUMENTS 230,323 A * 7/1880 Molera et al. ................ 60/641.8
1,473,018 A * 11/1923 Danner ......................... 126/661
(Continued)

FOREIGN PATENT DOCUMENTS

DE 2144558 A1 3/1973
EP 0 106 687 A2 4/1984
FR 2431101 A1 2/1980

OTHER PUBLICATIONS

Harms, Bill. Water hammer in steam systems: cause and effect. Plant Engineering, Sep. 2006, vol. 60, Iss. 9; p. 59.*

*Primary Examiner* — Thomas Denion
*Assistant Examiner* — Mickey France
(74) *Attorney, Agent, or Firm* — Reinhart Boerner Van Deuren P.C.

(57) ABSTRACT

The present invention relates to a heat exchanger configured to capture energy by radiation, comprising at least one flag-shaped basic exchanger (10), including: a) an input collector (5) and an output collector (6); b) a plurality of exchange tubes (1) connected to the input collector (5) and to the output collector (6), respectively, and stacked so as to halt the incident radiation, each tube (1) being provided in the form of a hairpin with one curved part at the head of the pin (4) and two arms (2, 3) adjoining essentially vertically and on the largest part of the length thereof, the end of the tubes (1) at the pin head (4) being free and the tubes (1) being self-supported at the ends thereof connected to said collectors (5, 6).

11 Claims, 7 Drawing Sheets

(56) References Cited

U.S. PATENT DOCUMENTS

| | | | | |
|---|---|---|---|---|
| 1,871,256 A | * | 8/1932 | Bulkeley | 165/176 |
| 1,915,807 A | * | 6/1933 | Thomsen, Sr. | 122/279 |
| 2,015,328 A | * | 9/1935 | Wood | 122/478 |
| 2,237,617 A | * | 4/1941 | Trede | 165/163 |
| 2,867,416 A | * | 1/1959 | Arthur | 165/169 |
| 4,269,172 A | * | 5/1981 | Parker et al. | 126/621 |
| 4,384,550 A | * | 5/1983 | Miller | 122/510 |
| 4,474,173 A | * | 10/1984 | Ford | 126/676 |
| 4,485,803 A | * | 12/1984 | Wiener | 126/591 |
| 4,665,700 A | | 5/1987 | Bratt | |
| 4,823,771 A | * | 4/1989 | Menning | 126/563 |
| 4,911,145 A | * | 3/1990 | Ohashi | 126/584 |
| 5,163,821 A | * | 11/1992 | Kelly et al. | 417/379 |
| 5,351,488 A | * | 10/1994 | Sorensen | 60/641.11 |
| 6,442,937 B1 | * | 9/2002 | Stone et al. | 60/641.11 |
| 2003/0101988 A1 | * | 6/2003 | Rhodes | 126/655 |
| 2006/0243432 A1 | * | 11/2006 | Demuth et al. | 165/176 |
| 2008/0011290 A1 | * | 1/2008 | Goldman et al. | 126/655 |
| 2008/0302314 A1 | * | 12/2008 | Gonzalez et al. | 122/1 R |
| 2009/0241939 A1 | * | 10/2009 | Heap et al. | 126/645 |
| 2010/0252025 A1 | * | 10/2010 | Kroizer et al. | 126/600 |
| 2012/0131941 A1 | * | 5/2012 | Ackner et al. | 62/235.1 |
| 2012/0304982 A1 | * | 12/2012 | Plotkin et al. | 126/663 |

* cited by examiner

FLAG-SHAPED HEAT EXCHANGER FOR CAPTURING RADIATION

FIELD OF THE INVENTION

The present invention relates to a heat-exchange device that is particularly adapted for a steam generator incorporated into a solar energy power plant. In particular, the invention relates to a heat exchanger associated with a steam overheater.

TECHNOLOGICAL BACKGROUND AND STATE OF THE ART

In the context of the current interest for sources of renewable energy allowing substantial reduction in $CO_2$ emissions, solar thermodynamic concentration power plants have in particular been developed. In this type of power plant, solar radiation is reflected by a series of mirrors concentrating it into a defined reduced zone, in order to heat a coolant. In particular, a boiler is installed in this zone and produces high-pressure and high-temperature steam. This steam is then intended to supply a steam turbine in order to produce electricity.

Several types of solar concentration power plants are known: tower plants, cylindro-parabolic sensor plants, and parabolic sensor plants.

In particular, the existing or planned tower plants allow to obtain high powers (between 10 and 500 MW). They are made of a field of solar sensors called heliostats allowing to heat the air or another coolant at temperatures above 1200° C.

Examples of these solar power plants may in particular be found in the following documents: DE 102 46 721 A, DE 102 48 068 B, EP-A-106 687, EP-A-106 688, FR-A-2 438 804, WO-A-2008/12390, etc.

Brief Description of a Boiler

In the context of the solar concentration power plant, the boiler comprises evaporators converting water into saturated steam and overheaters bringing the steam temperature to the desired level. The evaporators work by natural circulation with a balloon allowing the water/steam separation. All heat exchangers capture solar energy through pure radiation. There is thus no convective exchange.

The flow of incident radiation on the exchangers (expressed in $kW/m^2$) is the determining element in calculating the exchangers and their sizes, given the desired total power.

Calculating the maximum allowable thermal flow is based on the allowable metal temperature and on the calculated thermal exchange through the tube towards the coolant.

Thus, in the case of evaporators, the notion of internal flow of a biphasic fluid has an influence in limiting the maximum allowable thermal flow (critical heat flow characterized by the Departure from Nucleated Boiling or DNB, vanishing of the liquid or dryout).

Effects of Differential Expansion

Given the high fluid pressures encountered (e.g. 120 bars), the exchangers must inevitably be made of tubes, as only tubes are capable of holding that pressure. The tubes having their fronts exposed to the concentrated solar radiation are heated on one side, while their backs do not receive any thermal flow. This results in a temperature difference between the front face of the tube exposed to the radiation and the rear face thereof, which does not receive any radiation.

In the case of an evaporator (thus comprising a biphasic fluid), the excellent internal exchange coefficient of the tubes between the biphasic mixture and the metal of the tube contributes to equalising the front and back temperatures.

On the other side, in the case of an overheater (thus comprising dry steam), the internal exchange coefficient between the steam and the metal is much lower and the temperature difference between the front face and the rear face of the tube can reach very high values. This results in a "thermal switch" effect that will force the tube to bow.

If the tube is kept straight by mechanical means, the natural curvature thereby prevented turns into stress in the metal: the front of the tube will be compressed while the rear of the tube will be tensed.

This phenomenon very substantially limits the allowable thermal flow in the case of a flanged construction.

Document EP-A-0 106 687 describes a panel incorporating steam-generating (evaporator) tubes and overheater tubes. The evaporator tubes are spaced apart so as to offer the incident radiation a passageway between two adjacent tubes. Between two adjacent evaporator tubes and behind them, is an overheater tube, which thus receives some of the incident radiation.

In other words, the heat evaporator tubes and the overheater tubes are "staggered" relative to the incident solar flow, which allows to distribute the heat flow between the two exchangers. The overheater tubes are stuck between a support and the evaporator tubes, which are attached by connecting elements to this support. This configuration allows to avoid costly anti-vibration support elements for the evaporator tubes. Each evaporator tube is attached in several points over its length. As a result, even if they may expand longitudinally, the overheater tubes are also kept straight mechanically over their entire length, which involves the abovementioned stresses. Furthermore, the incident flow on the overheater tubes is limited by design.

AIMS OF THE INVENTION

The present invention aims to provide a solution that does not have the drawbacks of the state of the art.

In particular, the invention aims to design a heat exchanger, in particular of the overheater type, intended to contain dry steam, in the case of a boiler associated with a condensation solar power plant, said heat exchanger not having mechanical stresses caused by the differential expansion effect in the tubes of the exchanger.

MAIN CHARACTERISTIC ELEMENTS OF THE INVENTION

A first object of the present invention relates to a heat-exchange device configured so as to capture energy by radiation, with at least one elementary flag-shaped exchanger comprising:

a) an inlet collector and an outlet collector;
b) a plurality of exchange tubes connected to the inlet collector and to the outlet collector, respectively, and superposed in order to stop the incident radiation, each tube being in the form of a hairpin with a curved pin-head portion and two joined branches vertically superposed on the largest portion of their length, the end of the tubes at the level of the pinhead being free and the tubes being self-supported at their ends connected to said collectors.

According to particular embodiments of the invention, the above-mentioned heat-exchange device also comprises, in combination, one or more of the following features:

the pin head comprises a loop located by design in a tilted plane and having a bending radius that is suitably selected in order to limit the pressure loss, the device comprises a plurality of flag-exchangers arranged so that a flag of a given exchanger occults the collectors of an adjacent exchanger, the exchange tubes are arranged in such a way that they each have two opposite curved pin-head portions so that the collectors are positioned between both of these curved portions and so that the exchange tubes are cantilevered on either side of the collectors and configured so that the collectors are occulted by the flags respectively formed, a central ceramic cover is provided for completely occulting, relative to the incident radiation, elements found at the rear of the device, the energy captured by radiation is solar energy, said device is an overheater for a steam generator, the tubes are connected to the collectors so as to form, relative to the horizontal, a slope towards the collectors comprised between 1 and 5 degrees.

A second object of the present invention relates to a solar power plant with thermodynamic concentration comprising a boiler provided with a heat-exchange device as described above.

DESCRIPTION OF PREFERRED EMBODIMENTS OF THE INVENTION

The proposed solution to the aforementioned technical problem is, according to the invention, the design of a flag-shaped exchanger.

According to a first embodiment, each tube 1 of the exchanger 10 is arranged in a simple hairpin whereof the two branches 2,3 are vertically superimposed (FIGS. 1 to 4).

The pin head comprises a loop 4 then situated by design in a tilted plane and its bending radius is suitably selected in order to limit the pressure loss on the steam side.

The ends of the tubes 1 are then connected, for example welded, to each inlet 5 and outlet 6 collector, respectively.

Figure 1:
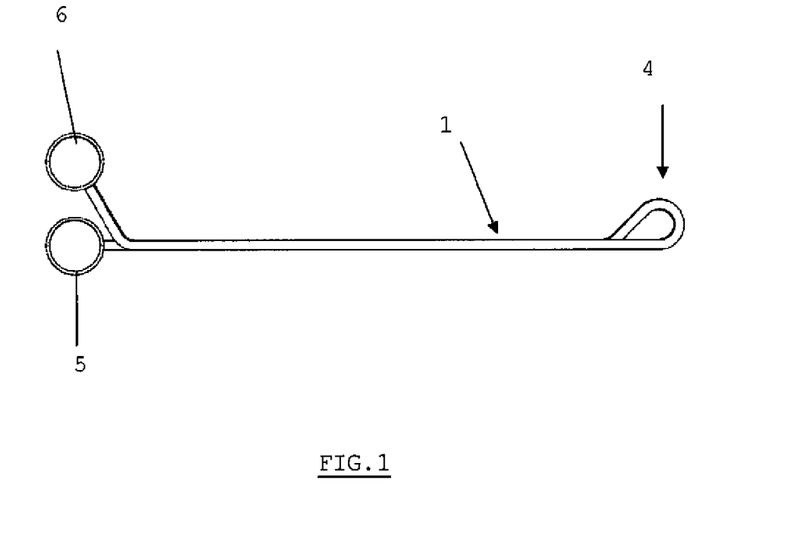
FIG. 1 shows a plane view of a first embodiment of an exchanger tube according to the present invention, having a pin shape and respectively connected to the inlet collector and to the outlet collector.
Figure 2:
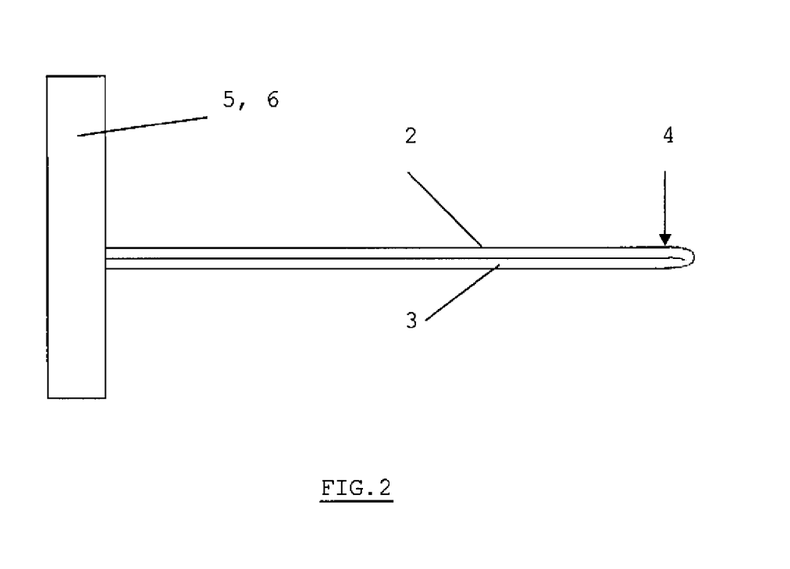
FIG. 2 shows an elevation view of the tube according to FIG. 1.
Figure 3:
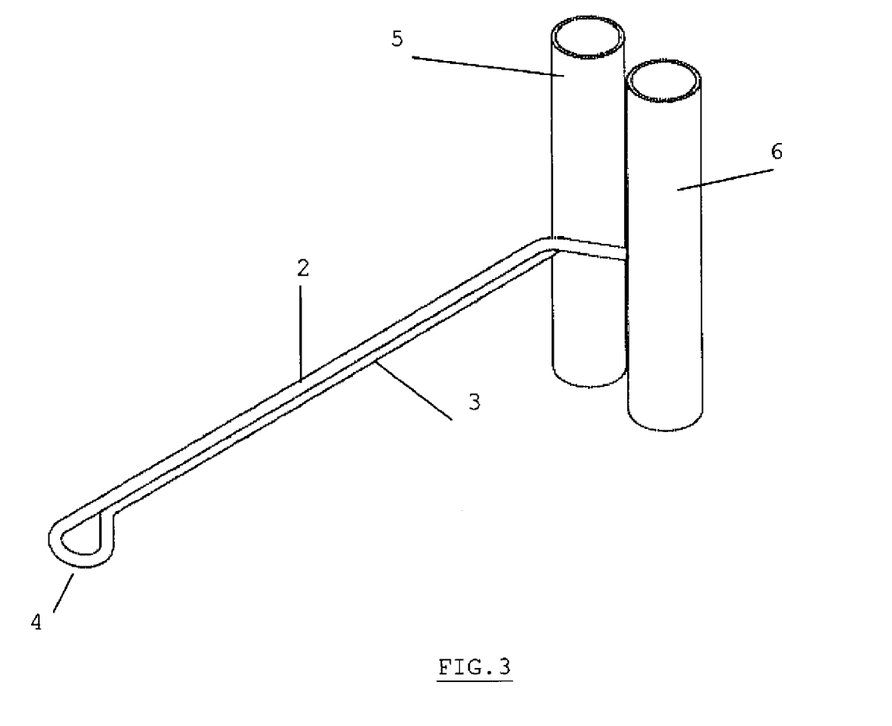
FIG. 3 shows a perspective view of the tube according to FIG. 1.
Figure 4:
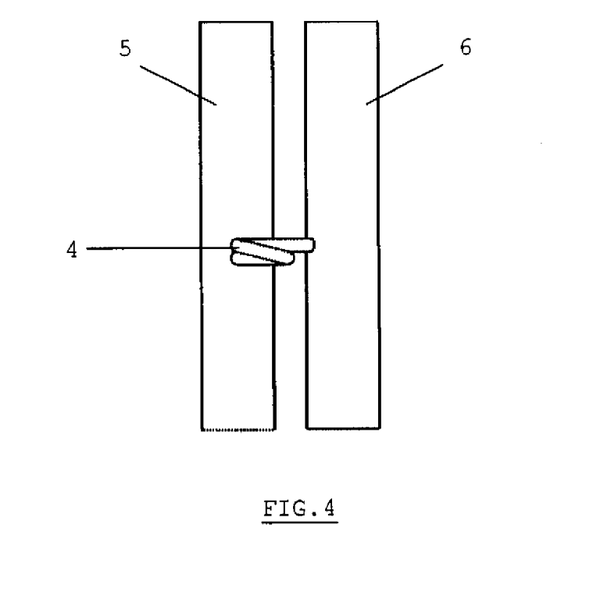
FIG. 4 shows another elevation view of the tube according to FIG. 1.
Figure 5:
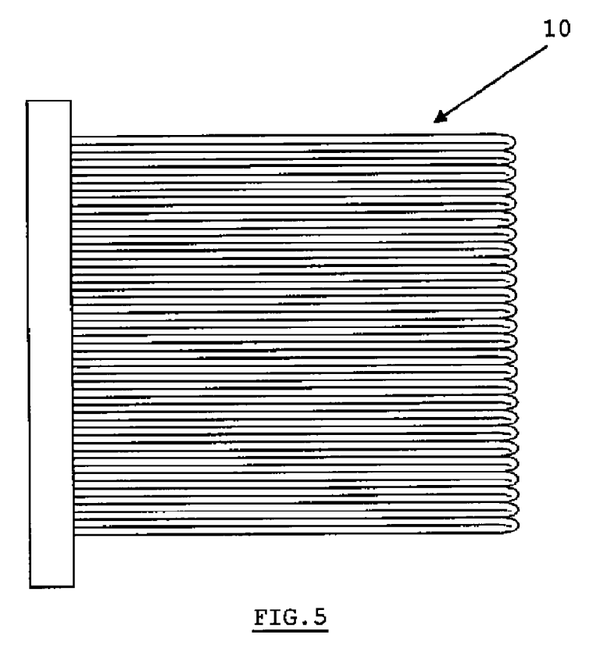
FIGS. 5 and 6 respectively show an elevation view and a perspective view of a first embodiment of the exchanger according to the present invention.
Figure 6:
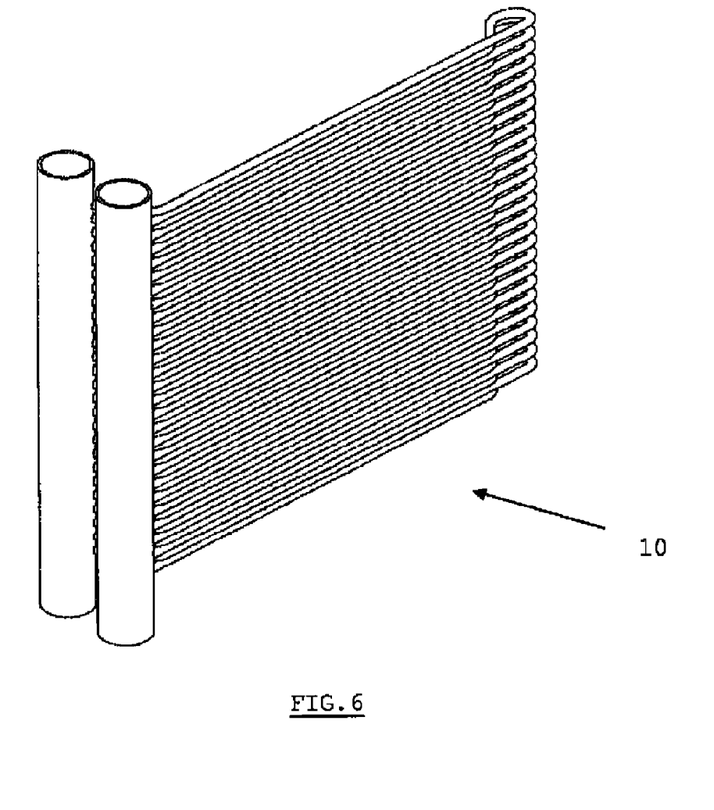

The superposition of pins thus makes up the exchanger 10, which is in the shape of a flag. According to the invention, the contiguous tubes 2,3 stop the light rays of the solar concentrator (FIGS. 5 and 6).

The tubes 1 are each self-supported and are free from their own thermal expansion, with a "thermal switch" effect thus freed. There is no more stress resulting from the thermal effects on the tubes, unlike the state of the art.

A complete exchanger may be made of several flag-exchangers arranged so that a given flag occults the collectors of another exchanger in order to prevent any radiation impact on the collectors and hence any thermal stress therein.

Figure 7:
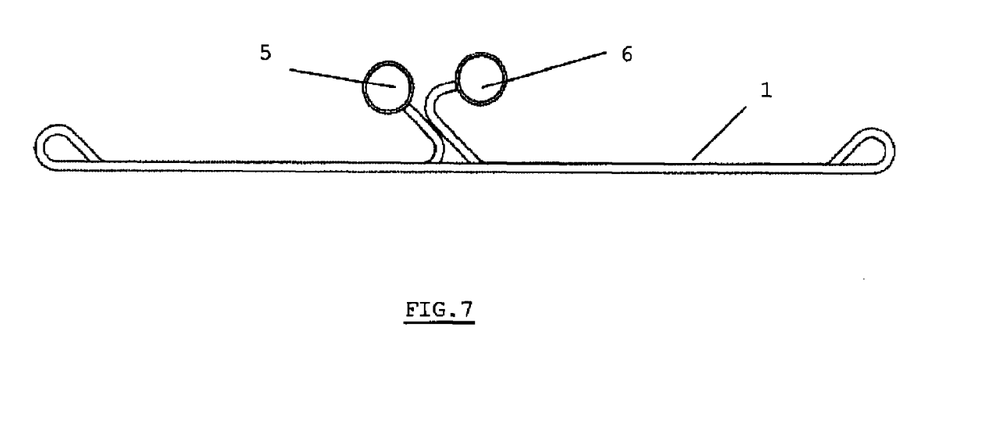
FIG. 7 shows a plane view of a second embodiment of an exchanger tube according to the present invention, respectively connected to the inlet collector and to the outlet collector.
Figure 8:
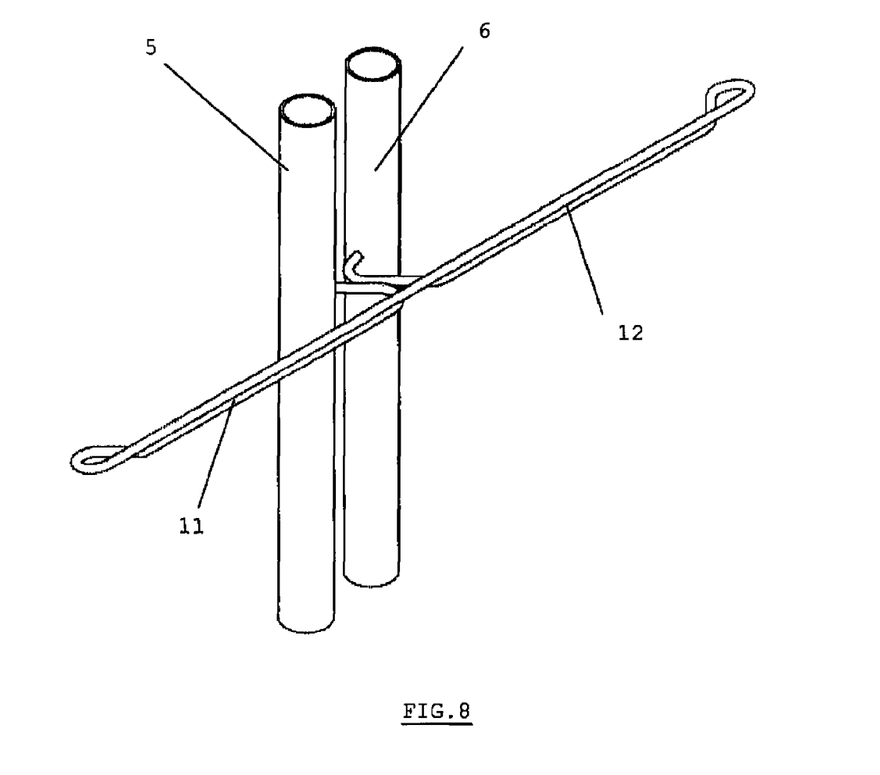
FIG. 8 shows a perspective view of the tube according to FIG. 7.
Figure 9:
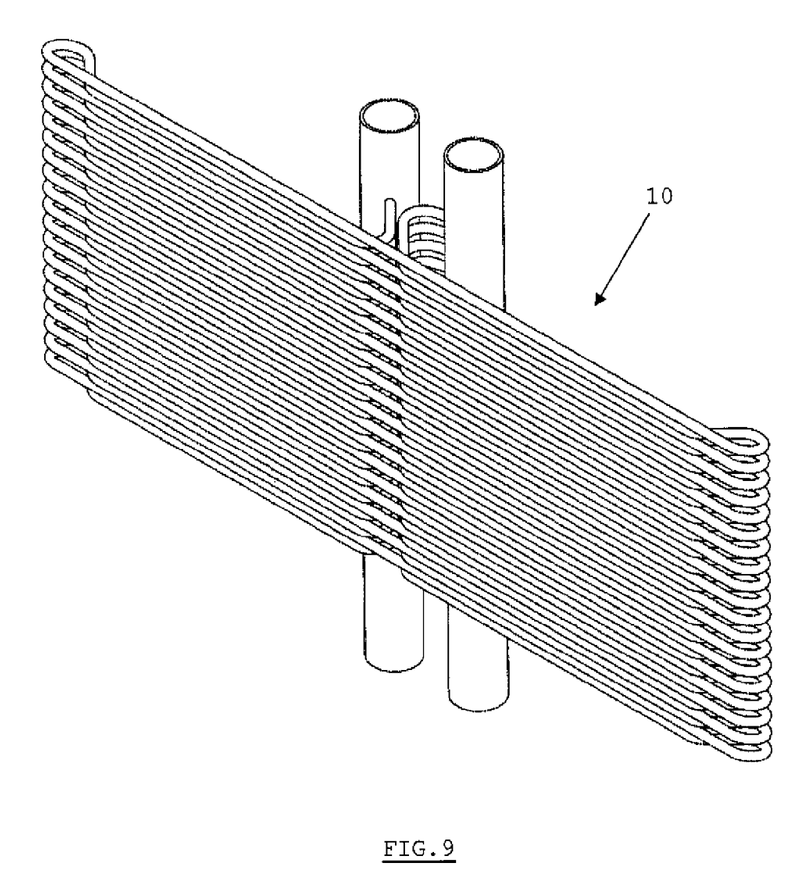
FIG. 9 shows a perspective view of a second embodiment of the exchanger according to the present invention.

An equivalent form, which is the object of a second embodiment of the invention, consists in installing the collectors 5,6 in the middle of the "loop," the tubes 1 then being cantilevered on either sides of the collectors 5,6 (FIGS. 7 to 9). In this case, a small area in the centre is not completely masked by the tubes 1 and a ceramic cover will advantageously ensure the total occultation of the panel 10 (not shown).

The technical problem solved by the invention is to eliminate, in particular in overheaters (with dry steam only), the stresses due to the differential expansion of the "thermal switch" type, when the tubes are kept straight by mechanical flanging. The pin-head ends are thus free to expand.

Figure 10A:
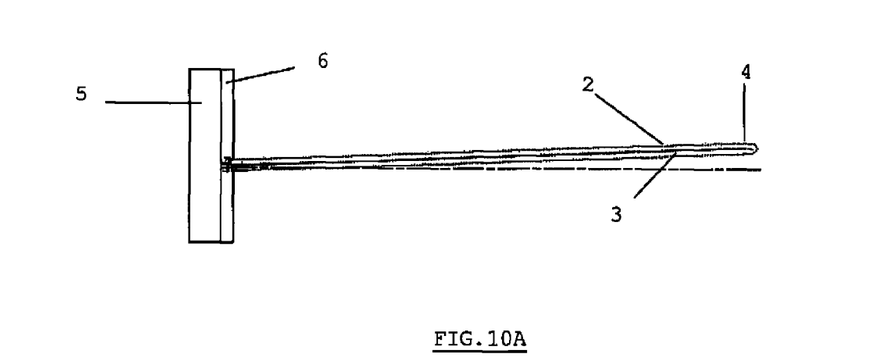
FIGS. 10A to 10C represent different views of an exchanger according to an advantageous embodiment where the tubes are slightly sloped towards the collectors.
Figure 10B:
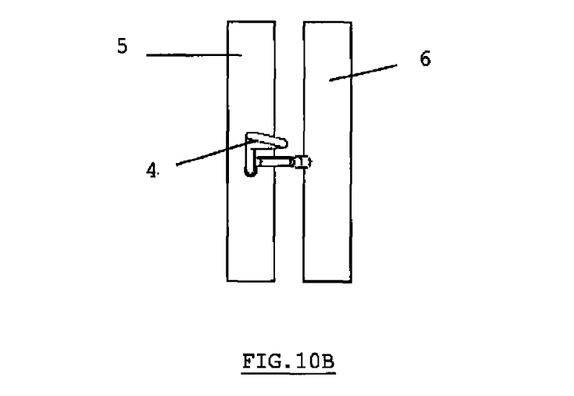
Figure 10C:
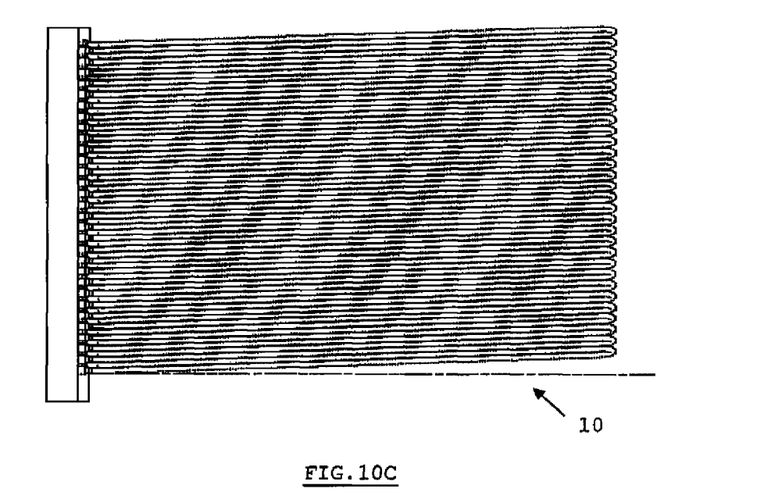

Another particularly advantageous embodiment of the invention is represented on FIGS. 10A to 10C. In this configuration, the tubes are linked to the collectors with a slight slope, for example 2 degrees, so as to improve their capacity to be emptied. When the installation is stopped, the tubes then remain perfectly dry and restarting the installation involves no risk of water hammer by mixing of water and steam.

Prior document EP-A-0 106 687 does not disclose the flag exchanger according to the invention and its self-supported and hairpin-shaped overheater tubes. In more detail, neither the evaporator tubes nor the overheater tubes are bowed in a hairpin and they are therefore not self-supported with an end that is free to expand. They are straight, parallel to each other, and always kept straight mechanically over their entire length, between the shared inlet and outlet collectors.

Figure 11:
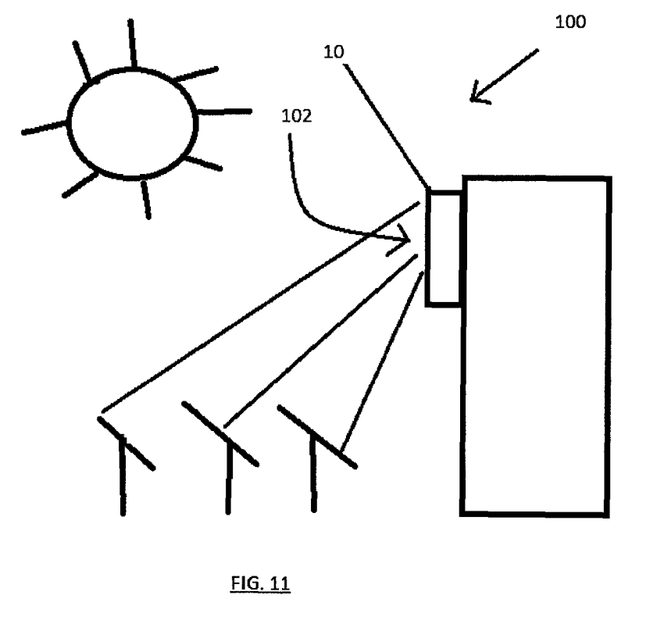
FIG. 11 shows a shematic view of a solar power plant with thermodynamic connection comprising a boiler provided with a heat exchanger.

FIG. 11 illustrates a solar power plant 100 with thermodynamic connection comprising a boiler 102 provided with a heat exchanger 10.

The invention claimed is:

1. A heat-exchange device configured so as to capture incident energy by radiation, with at least one flag-shaped elementary exchanger (10) comprising:
    a) a rectilinear inlet collector (5) and a rectilinear outlet collector (6) having parallel axes;
    b) a plurality of exchange tubes (1) connected to the rectilinear inlet collector (5) and to the rectilinear outlet collector (6), respectively, each exchange tube (1) being self-supported, in the form of at least one hairpin connected in cantilever fashion to the rectilinear inlet collector (5) and to the outlet collector (6) respectively, said hairpin having two branches (2,3) each branch comprising a rectilinear portion, said branches being of said collectors (5,6) and extended in a curved pinhead portion (4,11,12) which is distal of said collectors (5,6) and mechanically free, wherein the two branches (2,3) of each exchange tube (1) are joined transversally to the common direction of the respective parallel axes of the collectors (5,6), on the respective rectilinear portions of said branches (2,3), so that said rectilinear portions are substantially in a same plane and wherein all the exchange tubes (1) are stacked in the same plane so as to form, in use, a vertical flag stopping substantially all the incident radiation impinging on the heat-exchange device.

2. The heat-exchange device as in claim 1, wherein the pinhead (4) comprises a loop located by design in a tilted plane relative to the vertical flag and having a bending radius that is suitably selected in order to limit a pressure loss.

3. The heat-exchange device as in claim 1, wherein the device comprises a plurality of flag-exchangers (10) arranged so that a flag of a given exchanger occults the collectors (5,6) of an adjacent exchanger.

4. The heat-exchange device as in claim 1, wherein the exchange tubes (1) are arranged in such a way that each have two opposite curved pinhead portions (4) so that the collectors (5,6) are positioned between both of these curved portions and so that the exchange tubes (1) are in cantilevered support as they extend distally from the collectors (5,6) and configured so that the collectors (5,6) are occulted by the flags respectively formed.

5. The heat-exchange device as in claim 4, wherein a central ceramic cover is provided for completely occulting, relative to the incident radiation, elements found at the rear of the device.

6. The device as in claim 1, wherein the energy captured by radiation is solar energy.

7. The heat-exchange device as in claim 1, wherein said device is an overheater for a steam generator.

8. The heat-exchange device as in claim 1, wherein the tubes (1) are connected to the collectors (5,6) so as to form, relative to the horizontal, a slope towards the collectors (5,6) comprised between 1 and 5 degrees.

9. A solar power plant with thermodynamic concentration comprising a boiler provided with a heat-exchange device as in claim 1.

10. The heat-exchange device as in claim 1, wherein the heat-exchange device is arranged and located to receive solar rays from the sun and wherein the incident radiation that is stopped by the exchange tubes comprises the solar rays from the sun.

11. The heat-exchange device as in claim 1, wherein said rectilinear portions are approximately equal in length.

\* \* \* \* \*